US011341532B2

(12) United States Patent
Vincent et al.

(10) Patent No.: US 11,341,532 B2
(45) Date of Patent: May 24, 2022

(54) GATHERING MISSING INFORMATION ELEMENTS

(71) Applicant: Google Inc., Mountain View, CA (US)

(72) Inventors: Luc Vincent, Palo Alto, CA (US); Andrew Timothy Szybalski, San Francisco, CA (US)

(73) Assignee: Google LLC, Mountain View, CA (US)

( * ) Notice: Subject to any disclaimer, the term of this patent is extended or adjusted under 35 U.S.C. 154(b) by 395 days.

(21) Appl. No.: 15/675,011

(22) Filed: Aug. 11, 2017

(65) Prior Publication Data
US 2019/0050901 A1     Feb. 14, 2019

Related U.S. Application Data

(63) Continuation of application No. 12/891,974, filed on Sep. 28, 2010, now abandoned, which is a
(Continued)

(51) Int. Cl.
*G06Q 30/02* (2012.01)
*H04W 4/021* (2018.01)
*H04W 4/21* (2018.01)

(52) U.S. Cl.
CPC ..... *G06Q 30/0261* (2013.01); *G06Q 30/0252* (2013.01); *H04W 4/021* (2013.01); *H04W 4/21* (2018.02); *G06Q 30/0267* (2013.01)

(58) Field of Classification Search
None
See application file for complete search history.

(56) References Cited

U.S. PATENT DOCUMENTS 8,090,780 B2    1/2012    Hjelmeland Almas et al.
8,234,168 B1 *  7/2012    Lagle Ruiz ........ G06Q 30/0267
                                                    705/14.64
(Continued)

FOREIGN PATENT DOCUMENTS

WO          0041090 A1    7/2000

OTHER PUBLICATIONS

Anonymous, "Photo Request Using an Image and a missing content description," Feb. 24, 2016, IP.com, (Year: 2016).*
(Continued)

*Primary Examiner* — Hajime Rojas
*Assistant Examiner* — Rashida R Shorter
(74) *Attorney, Agent, or Firm* — Lerner, David, Littenberg, Krumholz & Mentlik, LLP

(57) ABSTRACT

This technology relates to requesting missing data associated with a geographic location. The system may comprise a memory for storing lists of information elements each associated with one or more physical types of geographic locations and a processor. The processor may be programmed to receive a current location of a client device and determine the current location is proximate to a first geographic location. The processor may determine a physical location type of the first geographic location and retrieve a list of information elements associated with the physical location type. The list of items may be compared to a set of information elements associated with the first geographic location and a determination of a missing information element may be made. A notification may be generated based on the missing information element and the determination that the client device is proximate to the first geographic location.

14 Claims, 15 Drawing Sheets

Related U.S. Application Data continuation-in-part of application No. 12/574,190, filed on Oct. 6, 2009, now abandoned.

(56) References Cited

U.S. PATENT DOCUMENTS

| | | |
|---|---|---|
| 8,405,740 B2 | 3/2013 | Nichols et al. |
| 9,558,177 B2 | 1/2017 | Dharmarajan et al. |
| 2003/0212567 A1 | 11/2003 | Shintani et al. |
| 2004/0172418 A1 | 9/2004 | Dorum et al. |
| 2005/0246334 A1 | 11/2005 | Tao et al. |
| 2006/0271593 A1 | 11/2006 | De Mes et al. |
| 2006/0277188 A1 | 12/2006 | Irish et al. |
| 2008/0172288 A1 | 7/2008 | Pilskalns et al. |
| 2008/0214157 A1 | 9/2008 | Ramer et al. |
| 2008/0242317 A1* | 10/2008 | Abhyanker ............. G06Q 30/02 455/456.3 |
| 2010/0009700 A1* | 1/2010 | Camp, Jr. ......... H04M 1/72572 455/456.6 |
| 2010/0088021 A1 | 4/2010 | Viner et al. |
| 2010/0107091 A1 | 4/2010 | Amsterdam et al. |
| 2011/0040691 A1 | 2/2011 | Martinez et al. |
| 2011/0143776 A1 | 6/2011 | Shankaranarayanan et al. |
| 2011/0302214 A1 | 12/2011 | Frye et al. |
| 2011/0313779 A1* | 12/2011 | Herzog ................. G06Q 50/01 705/1.1 |
| 2012/0166074 A1 | 6/2012 | Weng et al. |
| 2018/0278565 A1* | 9/2018 | Albouyeh ............... H04L 51/20 |
| 2018/0341907 A1* | 11/2018 | Tucker ............... G06Q 30/0623 |

OTHER PUBLICATIONS

M. Haklay and P. Weber, "OpenStreetMap: User-Generated Street Maps," in IEEE Pervasive Computing, vol. 7, No. 4, pp. 12-18, Oct.-Dec. 2008, doi: 10.1109/MPRV.2008.80. (Year: 2008).*
www.thisisgoingtobebig.com; printed Jul. 12, 2009.
http://networksboise.wordpress.com, printed Jul. 17, 2009.
http://crenk.com/foursquare-sxsws-break-out-mobile-app/, printed Jul. 12, 2009.
"PhotoCity" [online]. [Retrieved Aug. 9, 2011] Retrieved from the internet: http://photocitygame.com/about.php, 4 pages.
"Computers Turn Flat Photos Into 3-D Buildings" [online]. http://www.nytimes.com/2010/02/23/science/23crowd.html, Feb. 22, 2010, 3 pages.
"Ranger Adam" downloaded from http://groups.google.com/group/earth-data/browse_thread/thread/651da880c2f163f9#, dated Jan. 31, 2008.
How to Play Photocity (Mar. 2010) downloaded from http://photocity.cs.washington.edu/about.php.
The Rise of Crowdsourcing Wired Magazine Issue 14.06—Jun. 2006, downloaded from http://www.wired.com/wired/archive/14.06/crowds.html, on Feb. 4, 2013.
Australian Examination Report for Application No. 2010245847 dated Jul. 4, 2013.
A. Huertas and R. Nevatla, "Detecting changes in aerial views of man-made structures," Sixth International Conference on Computer Vision (IEEE Cat. No. 980H36271), Bombay, India, 1998, pp. 73-80, doi: 10.1109/ICCV.1998.710703. (Year: 1998).

* cited by examiner

GATHERING MISSING INFORMATION ELEMENTS

CROSS-REFERENCE TO RELATED APPLICATIONS

The present application is a continuation of U.S. patent application Ser. No. 12/891,974, filed on Sep. 28, 2010, which is a continuation-in-part of U.S. patent application Ser. No. 12/574,190, filed on Oct. 6, 2009, the disclosures of which are incorporated herein by reference.

BACKGROUND OF THE INVENTION

Systems heretofore utilize incentives to increase user participation in various programs. For example, some services grant users titles or badges for completing certain tasks before other users. Other systems, for example networking websites which maintain user profiles, may indicate a completion percentage of a user's profile. In another example, some videogames award arbitrary points to uses which complete tasks and succeed at the game. These examples motivate users to add information to their profiles and invite others to participate.

Map services also provide users with incentives for providing information. For example, the Google Maps service identifies which users have contributed information to the website. Other systems provide tips about things to do in the area based on GPS location and reward users with reputation points or badges for completing various types of activities.

Some map services such as Google's Street View provide users with street level and other images of locations. These types of map services often employ a great deal of images and image information in order to provide comprehensive and up to date coverage.

BRIEF SUMMARY OF THE INVENTION

A system and method of determining locations which require additional information and sending notifications of the same is provided. The system may make the determination based on a number of factors. The system and method also involve sending user notifications requesting the information. A server may receive geographic location information from a client device and determine if the client device is currently located proximate to a location which requires additional information. If so, the server may send the client device a notification. In response to the notification, the user may, for example, capture an image, upload the image, and receive incentives to maintain user interest.

One aspect of the invention provides a method of providing notifications. The method includes identifying a first geographic location and a type of the first geographic location; identifying a list of items associated with the type of geographic location; accessing a plurality of items stored in memory and associated with the first geographic location; identifying a given one of the list of items which is not included in the plurality of items associated with the first geographic location; receiving a current geographic location of a client device; determining whether the current location of the client device is proximate to the first geographic location; transmitting for display on a display device of the client device, a notification if the current geographic location is proximate to the first geographic location.

In one example, the current geographic location is proximate to the first geographic location if the first geographic location is within a fixed distance from the current geographic location. In another example, the determination of whether the device is proximate to the first geographic location is performed at a server computer. In another example, the method also includes associating the given item with the first geographic location; storing the association in the memory; and identifying the given item based on the current geographic location. In another example, the received current geographic location includes latitude and longitude information. In another example, the method also includes receiving, at a server computer, information including the given item; and including the given item in the plurality of items stored in the memory. In another example, the received information including the given item is an image and the method further comprises extracting the given item from the image. In another example, the given item is an image. In another example, the given item is information other than an image. In another example, the method also includes transmitting additional notifications requesting information to the client device if the client device has previously contributed to the plurality of items stored in the memory.

Another aspect of the invention provides a computer. The computer includes memory for storing a plurality of items each associated with one or more geographic locations and a processor coupled to the memory. The processor is operable to identify a first geographic location and a type of the first geographic location; identify a list of items associated with the type of geographic location; access the plurality of items stored and associated with the first geographic location; identify a given one of the list of items which is not included in the plurality of items associated with the first geographic location; receive, from a client device, a current geographic location of the client device; determine whether the current location of the client device is proximate to the first geographic location; and transmit for display on a display device of the client device, a notification if the current geographic location is proximate to the first geographic location.

In one example, the current geographic location is proximate to the first geographic location if the first geographic location is within a fixed distance from the current geographic location. In another example, the processor is also operable to associate the given item with the first geographic location; store the association in the memory; and identify the given item based on the current geographic location. In another example, the processor is also operable to receive, from the client device, information including the given item; and include the given item in the plurality of items stored in the memory. In another example, the received information including the given item is an image and the method further comprises extracting the given item from the image. In another example, the processor is further configured to transmit additional notifications requesting information to the client device if the client device has previously contributed to the plurality of items stored in the memory.

A further aspect of the invention provides a client device. The client device includes electronic display for displaying information to a user; a geographic positioning device for determining a current location of the client device; and a processor coupled to the electronic display and the geographic positioning device. The processor is operable to transmit, over a network to a computer, a current geographic location of the client device from the geographic positioning device; receive one or more geographic locations from the computer, each of the one or more geographic locations being within a threshold distance from the current location of the client device; and display on the display a notification requesting information associated each of the one or more geographic locations.

In one example, the processor is also operable to identify a given one of the one or more geographic locations; receive the information associated with the given one of the one or more geographic locations; transmit the received information to the computer. In another example, the information associated with the given one of the one or more geographic locations is an image. In another example the information associated with the given one of the one or more geographic locations is information other than an image.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
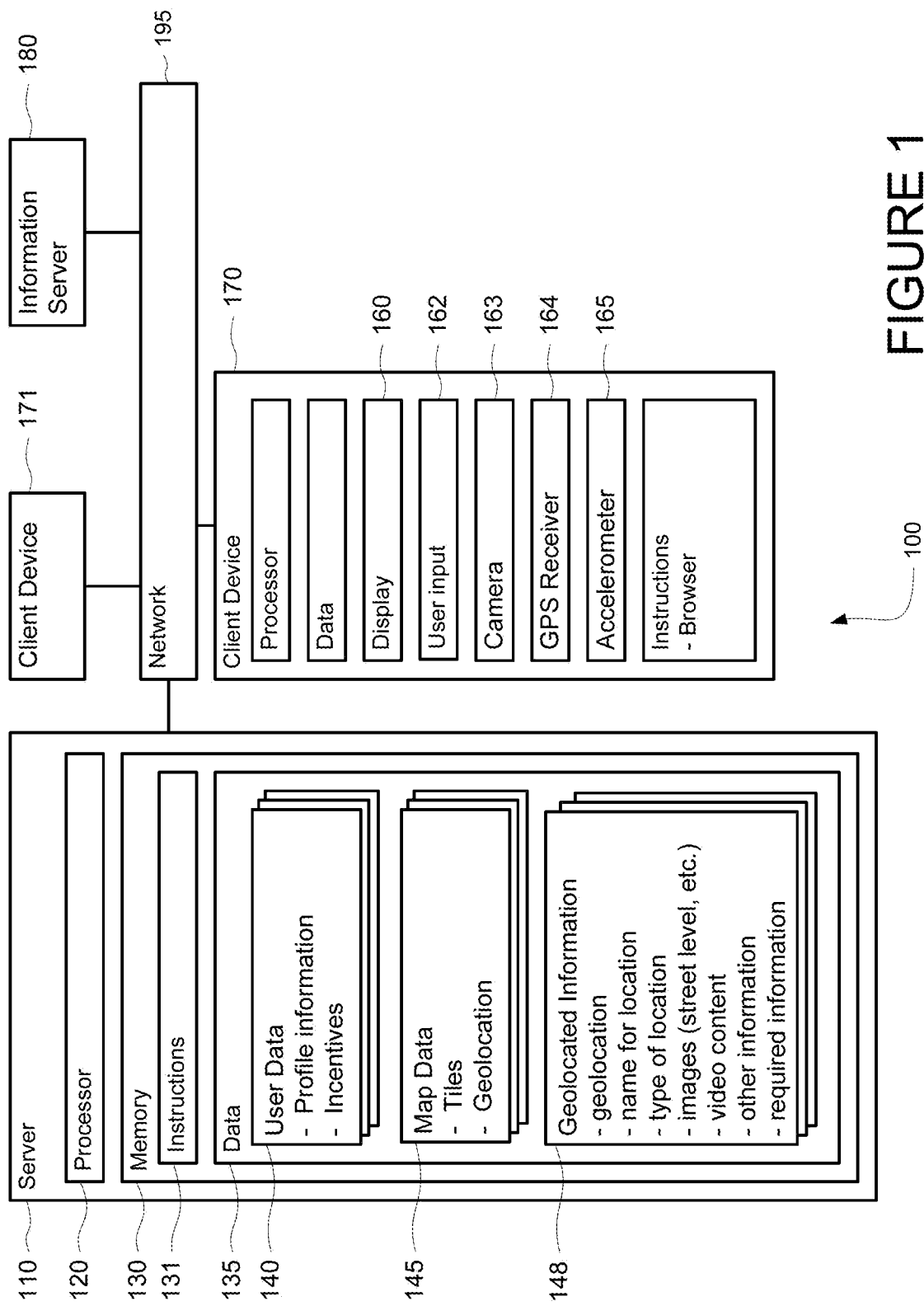
FIG. 1 is a functional diagram of a system in accordance with an aspect of the invention.
Figure 2:
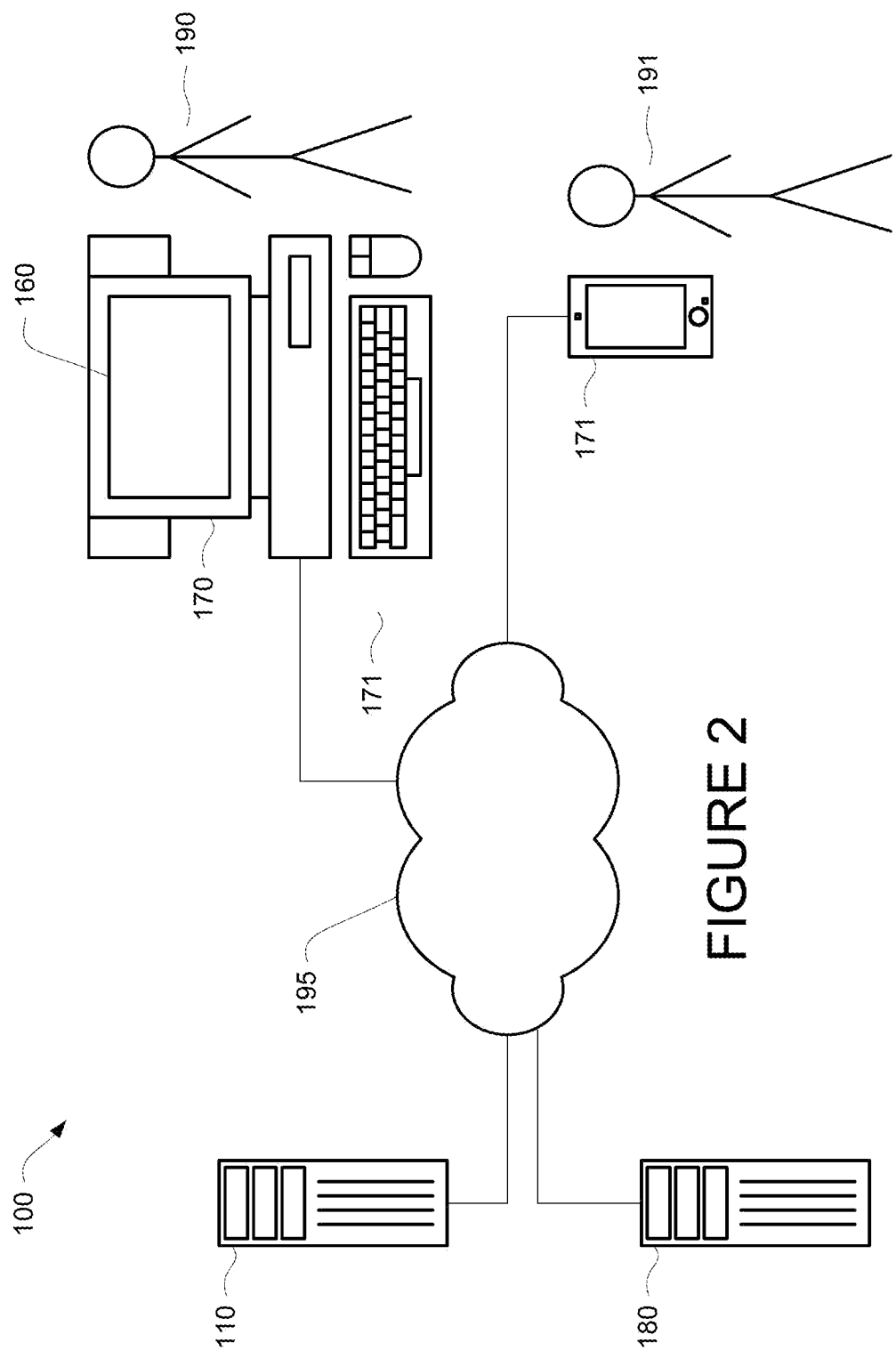
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. Memory also includes data 140 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or Advanced Micro Devices. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 170-71 as well as one or more information servers 180 (only one additional server being depicted in FIGS. 1-2 for clarity). For example, computers 110, 180 may be web servers. Computers 170-171, 180 may be configured similarly to the server 110, with a processor, memory and instructions.

Each client computer 170-71 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input 162 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the computers 170-71, 180 may comprise a full-sized personal computer, the system and method may also be used in connection with mobile devices capable of wirelessly exchanging data with a server over a network such as the Internet. For example, client computer 170 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA), a camera 163, or any other means of user input.

Location and orientation information may be transmitted to the server 110 periodically by a program of the client device or received by server 110 during connection with the client device in conformance with communication protocols. For example, the device may use a browser such as Google Chrome or the browser of the Android operating system, each of which may be configured with user permission to send GPS information to trusted network sites (such as www.google.com). In that regard, it will be understood that a client device's provision of location and orientation data as set forth herein may be provided automatically to the user, to the server, or both.

Server 110 may use the location and orientation information to determine a location of the device. Because the accuracy of GPS determinations may depend on the quality of the device and external factors such as environment, the device may further transmit data indicative of accuracy. For example, the client device 170 may inform the server 110 that the transmitted latitude/longitude position is accurate within 100 meters, i.e., the device may be at any location within 100 meters of the transmitted position. The server may also assume a level of accuracy in the absence of such information.

The server 110, client computers 170-71, and information server 180 are capable of direct and indirect communication, such as over a network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Data 150 may be associated with user data 140. User data 140 identifies users of the systems, i.e., any entity that interacts with the system and method such as people who upload images to server 110. As described in more detail below, user data 140 may also store information regarding incentives earned and profile information for each user.

Map data 145 of server 110 may store map-related information, at least a portion of which may be transmitted to a client device. For example, map database 145 may store map tiles 147, where each tile is a map image of a particular geographic area. Depending on the resolution (e.g., whether the map is zoomed in or out), one tile may cover an entire region, such as a state, in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles 147 are each associated with geographical locations, such that the server 110 is capable of selecting, retrieving and transmitting one or more tiles in response to receipt of a geographical location.

As noted below, the locations may be expressed in various ways including but not limited to latitude/longitude positions, street addresses, points on a map (such as when a user clicks on a map), building names, other data capable of identifying one or more geographic locations, and ranges of the foregoing.

Data 135 may include geolocated information 148. Each geographic location, such as a latitude and longitude coordinate set, may be associated with various types of information. For example, if a particular location were to correspond to a business, the location may be associated with information regarding the name of the business (e.g. "pizza Restaurant"), type of business, images of the business (e.g. restaurant), video of events occurring at or near the business, phone numbers, hours of operation, etc. Images may include street level images, areal views, views of the inside of a building, general images associated with the location (e.g. the restaurant may be associated with images of food), and other non-street level views.

Some images, such as street level images, may be further associate with information indicating the orientation of the image. For example, if the street level image comprises a typical photograph, the orientation may indicate the camera angle such as data representing an angle that is 30° east of true north and rises 2° from ground level. If the street level images are panoramic images, such as 360° panoramas centered at the geographic location associated with the image, the orientation may indicate the portion of the image corresponding with looking due north from the camera position at an angle directly parallel to the ground.

Based on the type of geographic location, the server may also be able to determine what, if any, information is missing. In other words, what additional information the server needs about a particular location. For example if a location is a business, the server may determine that the business hours are unavailable or have been reported by a user as incorrect. Thus, server 110 may determine that this information is required. However, if the location is associated with a private home, the server may determine that hours of operation would not require such information. Other examples, of required information may include street names, house numbers, images, phone numbers, email addresses, menus, etc.

Figure 3:
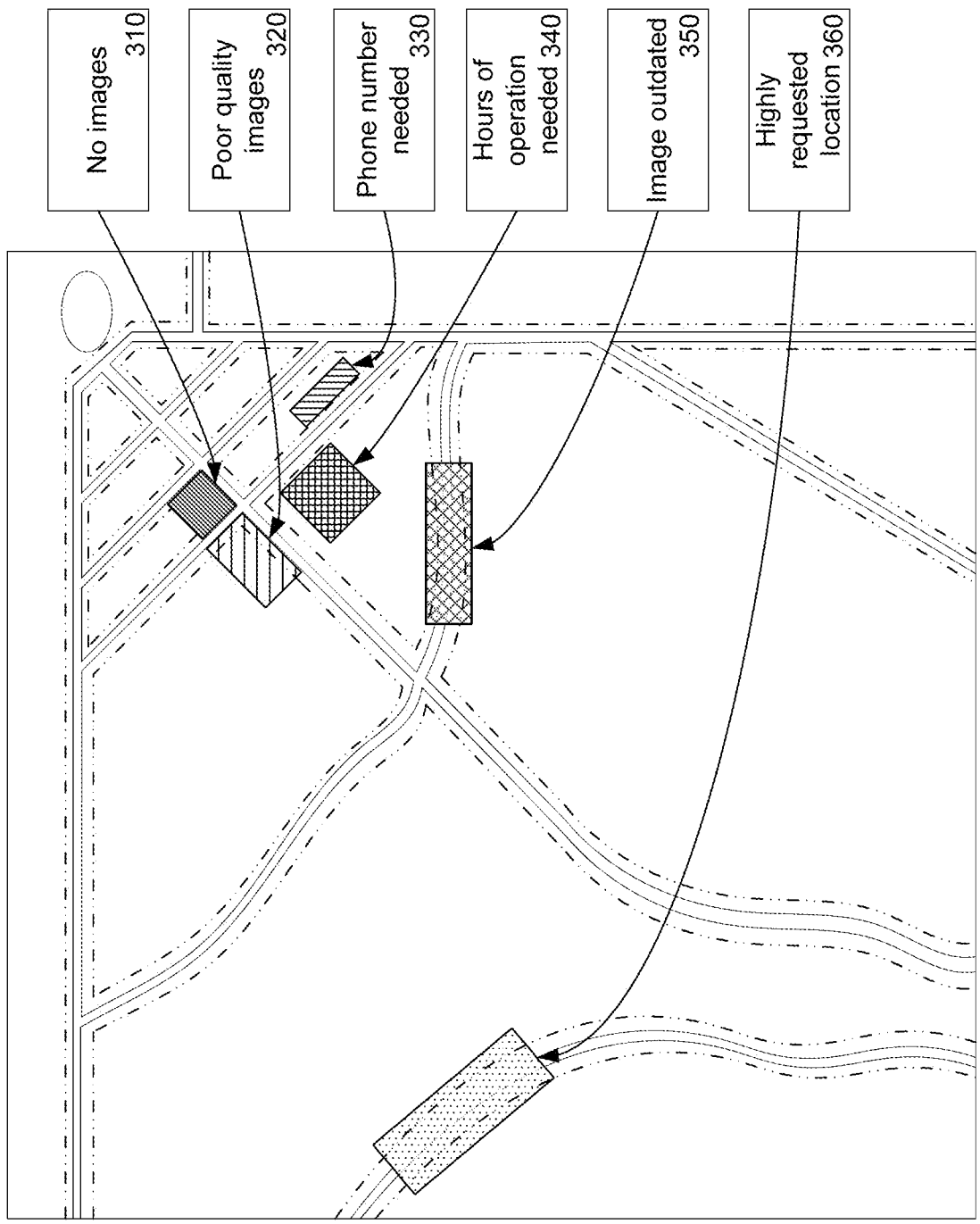
FIG. 3 is a diagram in accordance with one aspect of the invention.

The server may associate the required information with a geographic location and store the association in memory. For example, as shown in block 330 of FIG. 3, server has determined that a phone number associated with the location is required. In another example, as shown in block 340, server 110 may determine that the hours of operation, such as those of a business or government building (e.g. library or town hall), are required.

Similarly, the server may determine that images of specific locations are insufficient. For example, the server may determine that some locations, indicated in FIG. 3 by dotted lines, are not associated with required information, such as when no information is missing. Server 110 may also determine that images in some areas are missing as in block 310. Server 110 may also determine that images are insufficient because of a large number of users are requesting information about a particular location as in block 360. Some locations may require additional images because of gaps in image data. For example, locations which have few or no images may require additional images. Such locations may be associated with a "percentage complete." In another example, server 110 may determine that there are no images of a certain location. Such locations may be considered "uncharted territory" and defined as a number of miles from the nearest geographic location associated with an image.

Other locations may require additional information may be defective for some reason. For example, an image may be of poor quality as in block 320, too light, too dark, blurry, or the like. An image file may also be corrupted, such that server 110 is unable to access or otherwise use the image. In another example, information may be out of date, as in block 350, from an unreliable of discredited source, or reported as incorrect information.

The server may determine that one or more images are required because the status or subject of a location has changed and the current image is out of date. This may be determined in various ways. For example, server 110 may connect to one or more information servers and retrieve information regarding the status of a particular location. Information server 180 may include information such as business listings, telephone directories, user contributions, or information about events at a particular location. Such changes in status may include a business closing, changing its name, a new building or road being constructed, or the like. Such changes may also be expected to have an effect on the objects at the location, such as the signs on a building. In one example, server 110 may collect information from one or more data sources such as information server 180 regarding the status of an area. Server 110 may also use this information to determine that whether area as changed since the existing imagery was collected.

Server 110 may determine that additional information is needed because of the volume of user requests regarding a particular location. For example/if a large number of users are requesting information regarding an address or other location, server 110 may determine that additional images and/or other information are needed to satisfy the demand for information regarding the location.

The system may evaluate each of the above factors for a variety of different locations and determine whether additional information is required.

The instructions of the client device may also include routines, such as a notification/upload program, for notifying the user of information requested by the server, uploading images of desired locations to the server, and other features as explained more detail below.

A client device may receive a notification when the client device is proximate to a geographic location associated with required information. For example, client device 170's current location as determined by geographic position component 164 may be compared with a set of locations associated with required information and provided by server 110. The comparison may occur at client device 170 by downloading a set of desired locations from the server 110, by periodically uploading (with the user's permission) the location of the client device to the server 110, etc. The comparison may also occur at the specific request of the user, when the user selects a program, or automatically without user input. For ease of illustration and not by way of limitation, many of the remaining examples assume that a notification program on the client device remains in periodic communication with the server so as to determine whether the device is near a desired location.

Figure 4:
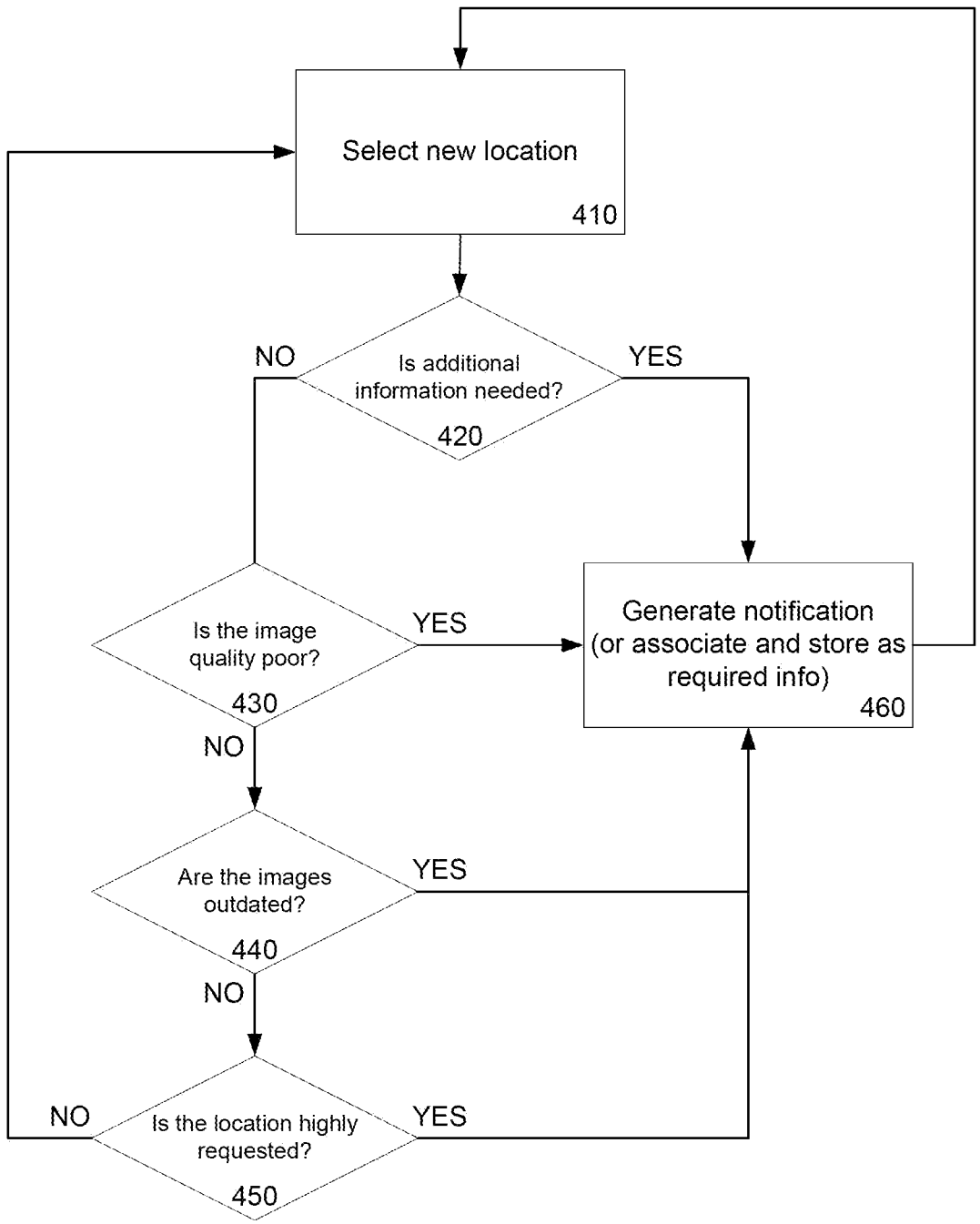
FIG. 4 is a flow diagram in accordance with an aspect of the invention.

FIG. 4 illustrates an exemplary process of identifying required information. AS described above, this process may occur at the server, client device, or both. It should be understood that the following operations do not have to be performed in the precise order described below. Rather steps can be handled in reverse order or simultaneously. As shown in block 410, a geographic location is selected. The location type may be compared to information generally associated with the location (as discussed above) in order to identify additional information required for the selected geographic location. If such additional information is identified, a notification is generated at block 460. If no information is required, the images may be reviewed to determine whether new images would be required for another reason, such as if image quality is poor at block 430, if the images are outdated at block 440, or if the location is highly requested at block 450. If new images are required, for any of the aforementioned reasons, a notification is generated at block 460. Alternatively, rather than instantly generating notifications, images which are required to be replaced and identified additional information may be associated with the selected geographic location and stored in memory accessible by the server for later retrieval.

Figure 5:
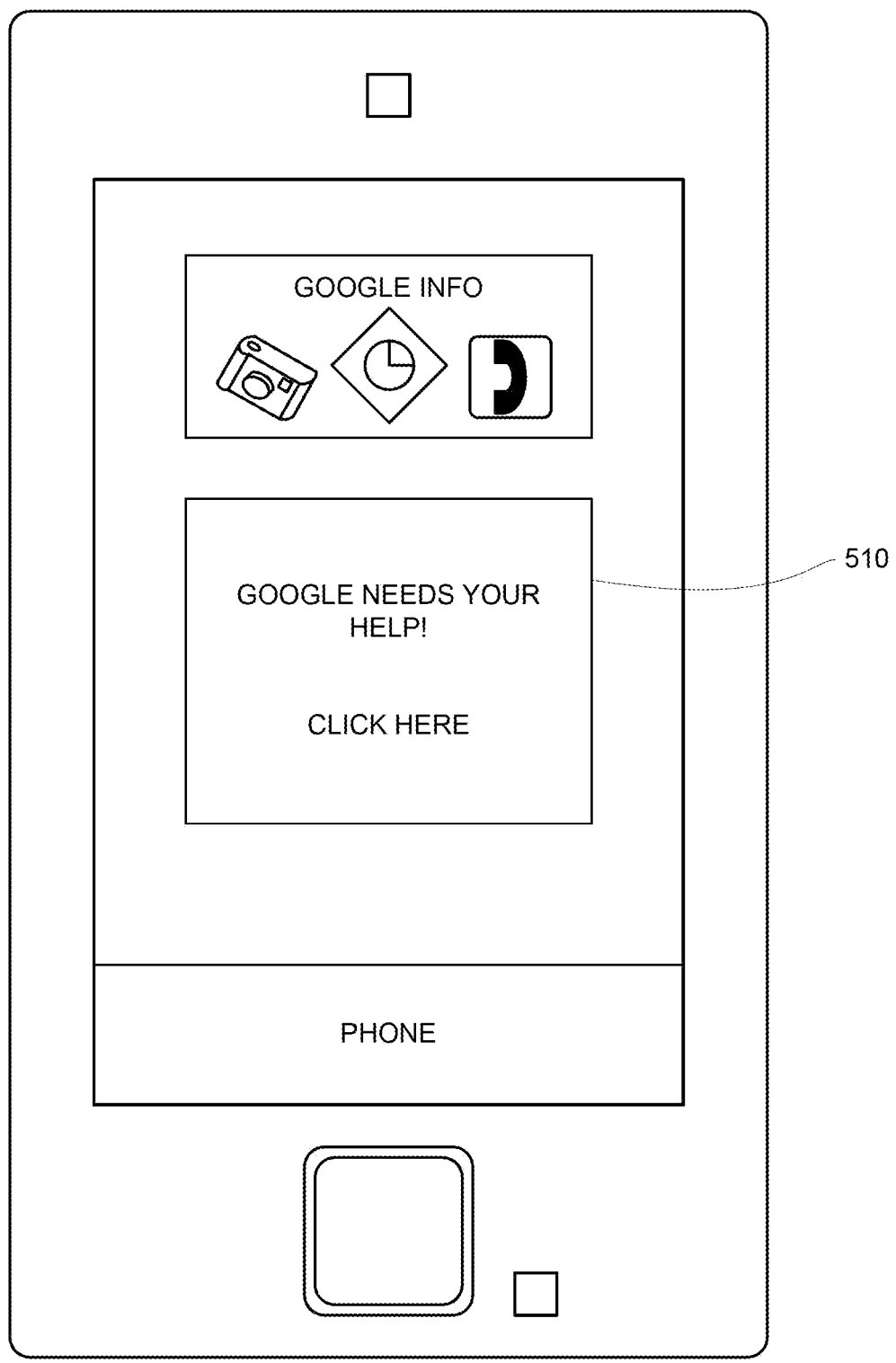
FIG. 5 is a client device and screen image in accordance with an aspect of the invention.

In one aspect, a notification may be visual and be displayed on the electronic display of a client device. As shown in FIG. 5, client device 170 may display a notification 510. In addition to visual notifications, notifications may also be audible, for example by playing sound through the speakers of the client device. In some examples, the user of client device may be notified by a flashing screen and beeping speaker when the client device is proximate to a required location.

Figure 6:
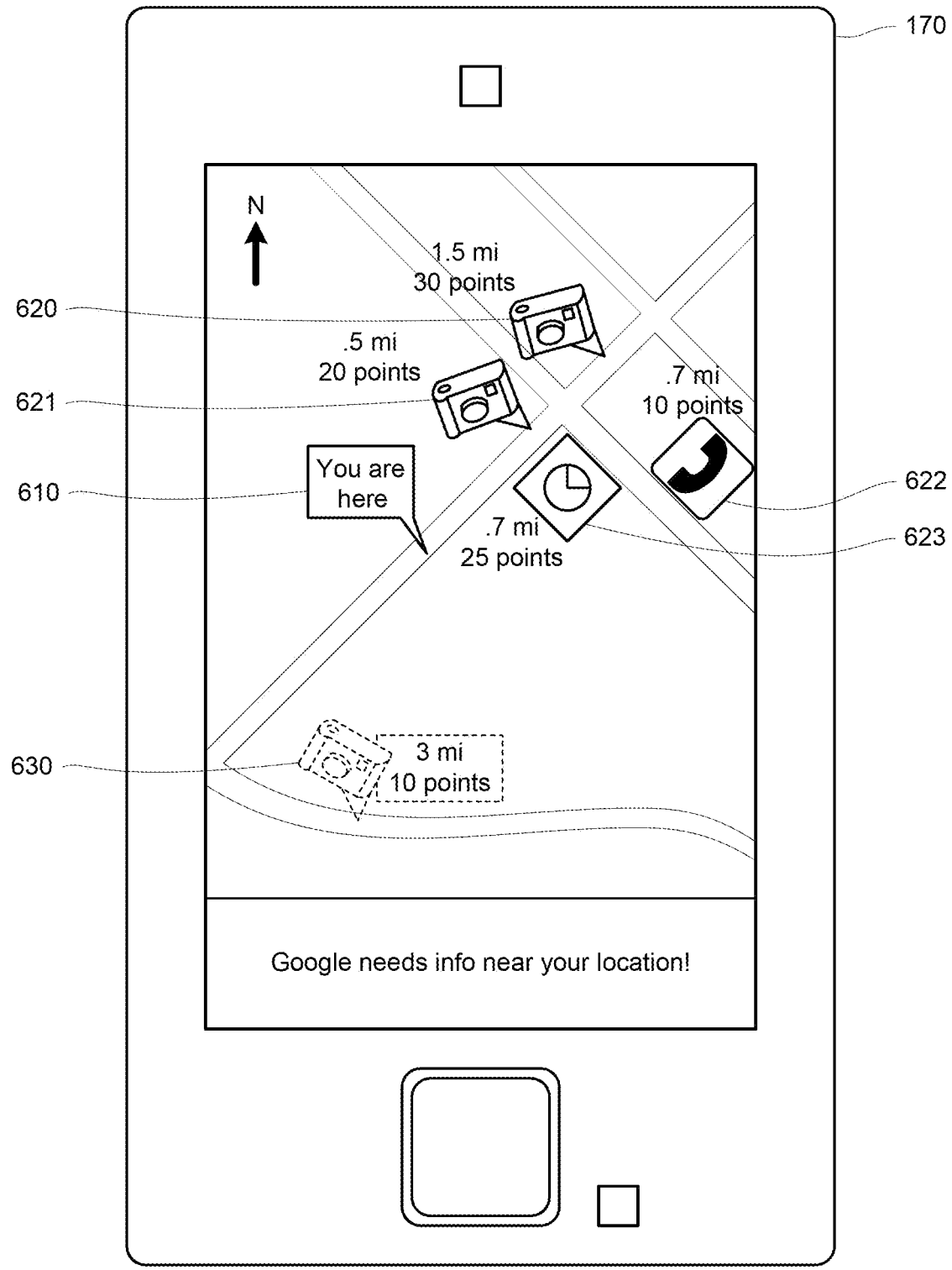
FIG. 6 is a client device and screen image in accordance with an aspect of the invention.

The notification may also include a map indicating the current location of the client device and various locations associated with required information. As shown in FIG. 6, client device 170 may display a map indicating the current location of the client device 610 and one or more locations which the information. For example, server requires additional visual indicators 620-623 may be displayed proximate to or represent locations on a map which the server has determined require information.

The visual indicators may not only indicate the location where the required information may be found or collected, but also the type of information which is required. For example, visual indicators 620-621 may be camera icons indicating that images are required. Similarly, visual indicator 622 may be a clock icon indicating that hours of operation are required, and visual indicator 623 may be a phone icon indicating that a phone or fax number is required.

Some locations which require information may not be For example, camera indicator 630 may not be displayed because the server 110 may have determined that the distance from the location associated with the indicator to the device's current location is too great.

Each visual indicator may be associated with other types of information. For example, each visual indicator may also be associated with information defining a distance between the current location of the device and the location of the visual indicator. In addition, as will be explained in more detail below, each visual indicator may also be associated a point value associated with images of the location. Accordingly, as shown in FIG. 6, each visual indicator may be displayed with a distance and point value.

Figure 7:
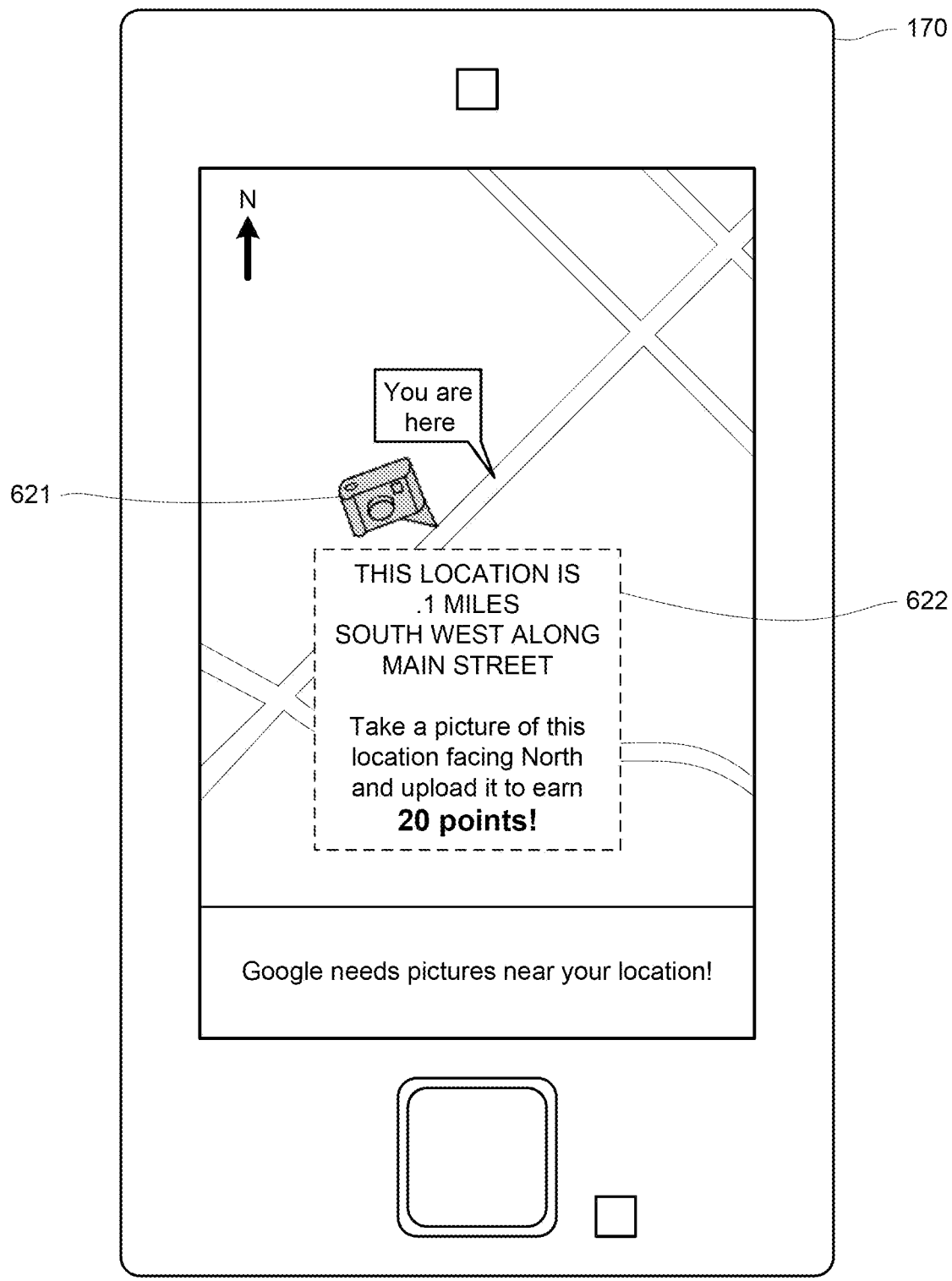
FIG. 7 is a client device and screen image in accordance with an aspect of the invention.

The user may select a particular visual indicator to obtain more information. For example, if the display is a touch screen, the user may select a visual indicator by pressing on the image on the touch screen. Alternatively, the user may move a pointer over a visual indicator and press a button to select the visual indicator. As shown in FIG. 7, a user may select visual indicator 621, a camera icon, which is associated with a required image. Once selected, the client device may display information, such as information block 710, regarding the geographic and orientation of the particular image required by the server.

Figure 8:
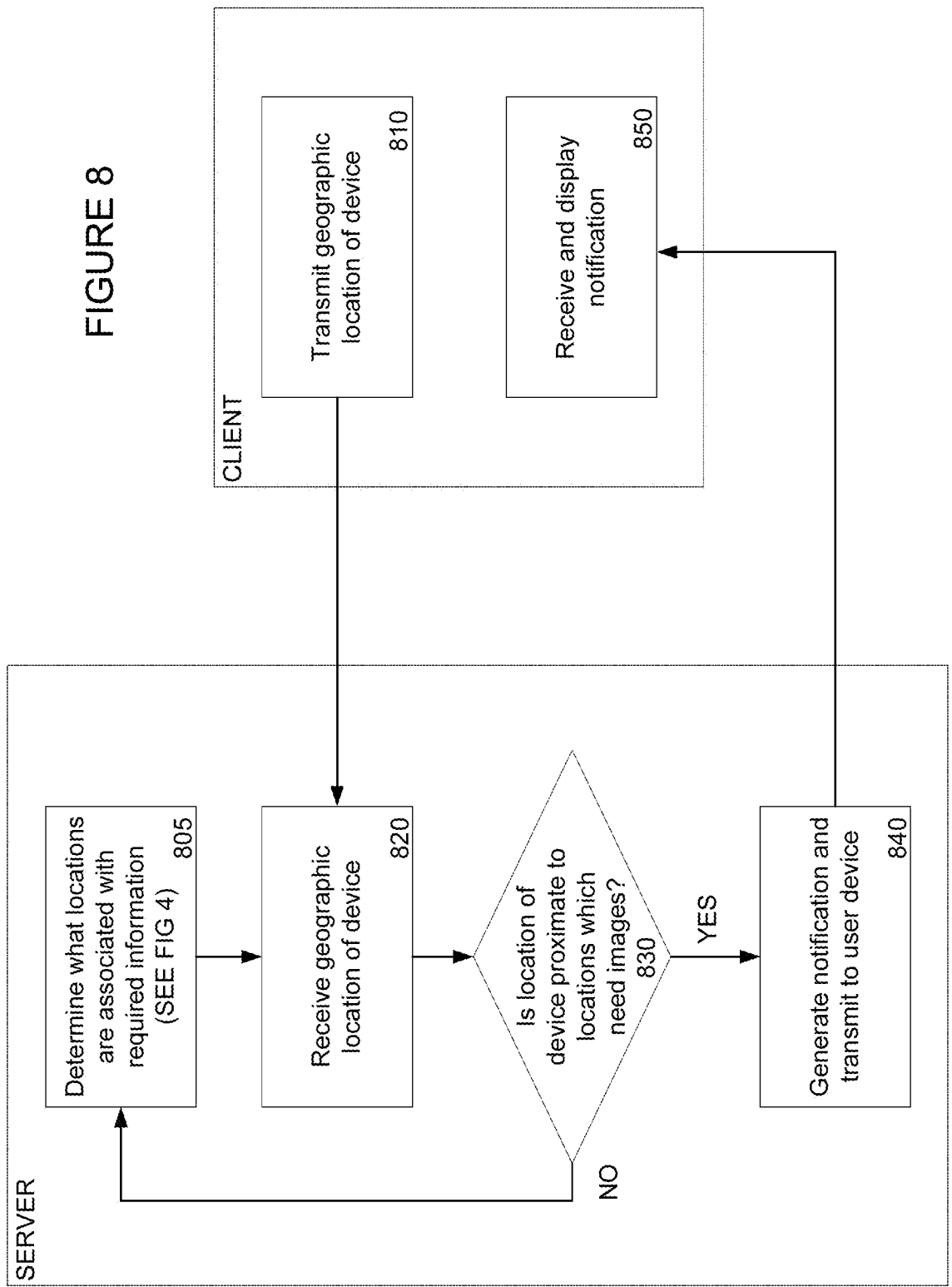
FIG. 8 is a flow diagram in accordance with an aspect of the invention.

FIG. 8 illustrates an exemplary process generating notifications based on the current location of the client device. It should be understood that the following operations do not have to be performed in the precise order described below. Rather steps can be handled in reverse order or simultaneously. For example, the server may determine which locations are associated with required information as shown in block 805 (and for example, FIG. 4). At block 810, a client device transmits the geographic location of the device, such as GPS coordinates or an IP address. The server receives the geographic location, at block 820, and determines whether the device's location is proximate to a location which requires information at block 830. If the device's location is proximate to a location which requires information, the server will generate a notification and transmit it to the client device. Upon receipt of the notification, the client device may display the information as shown in block 850 (and, for example in FIG. 5).

Figure 9:
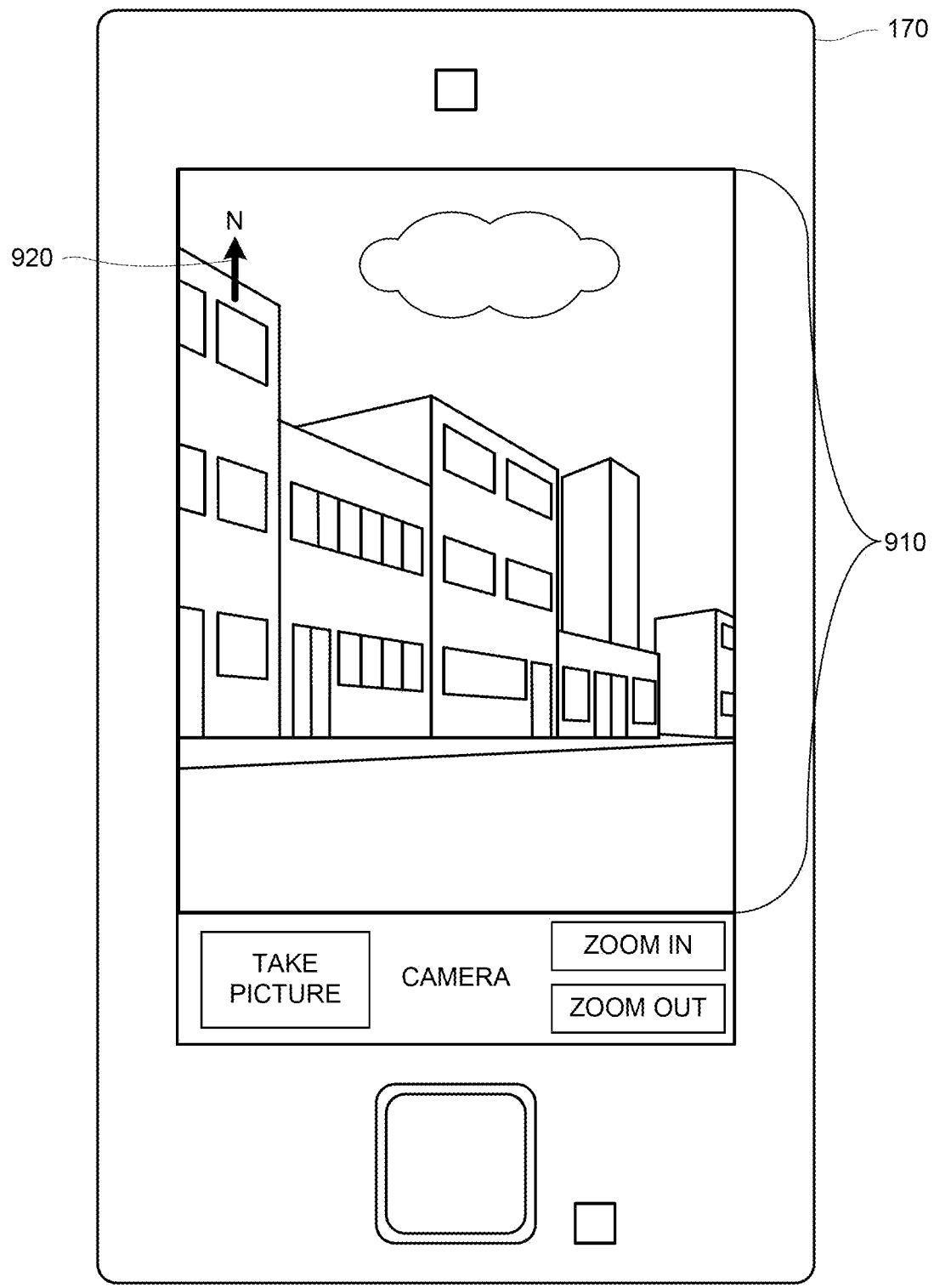
FIG. 9 is a client device and a screen image in accordance with an aspect of the invention.

Upon receipt of the notification, the user may travel to the desired location, if necessary, and collect the required information. In one aspect and as shown in FIG. 9, a custom program may launch allowing the user to take and preview an image 910. The program may provide the user with assistance in determining the correct orientation, such as an indication of the current orientation 920 of the client device.

Figure 10:
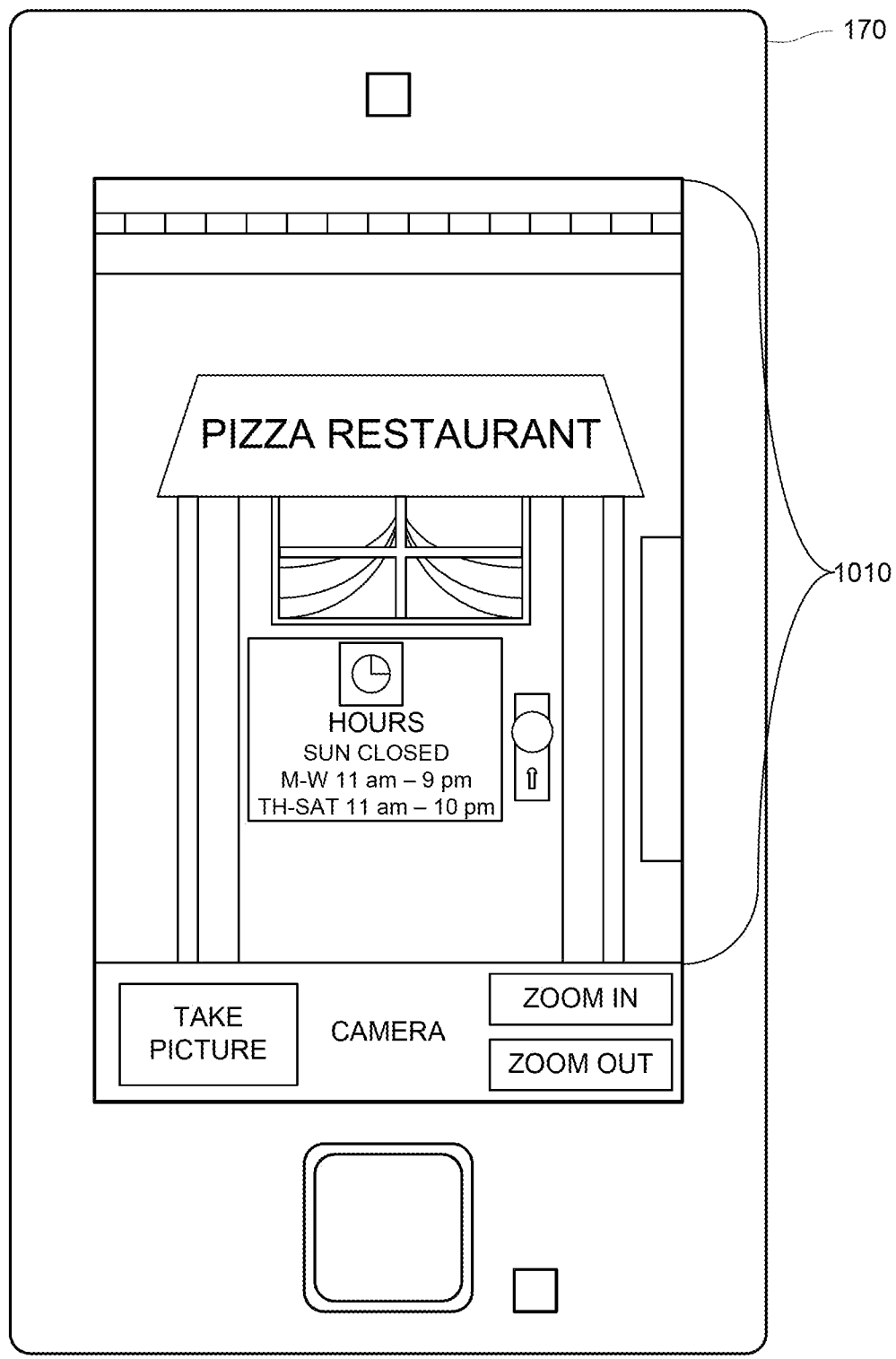
FIG. 10 is a client device and screen image in accordance with an aspect of the invention.
Figure 11:
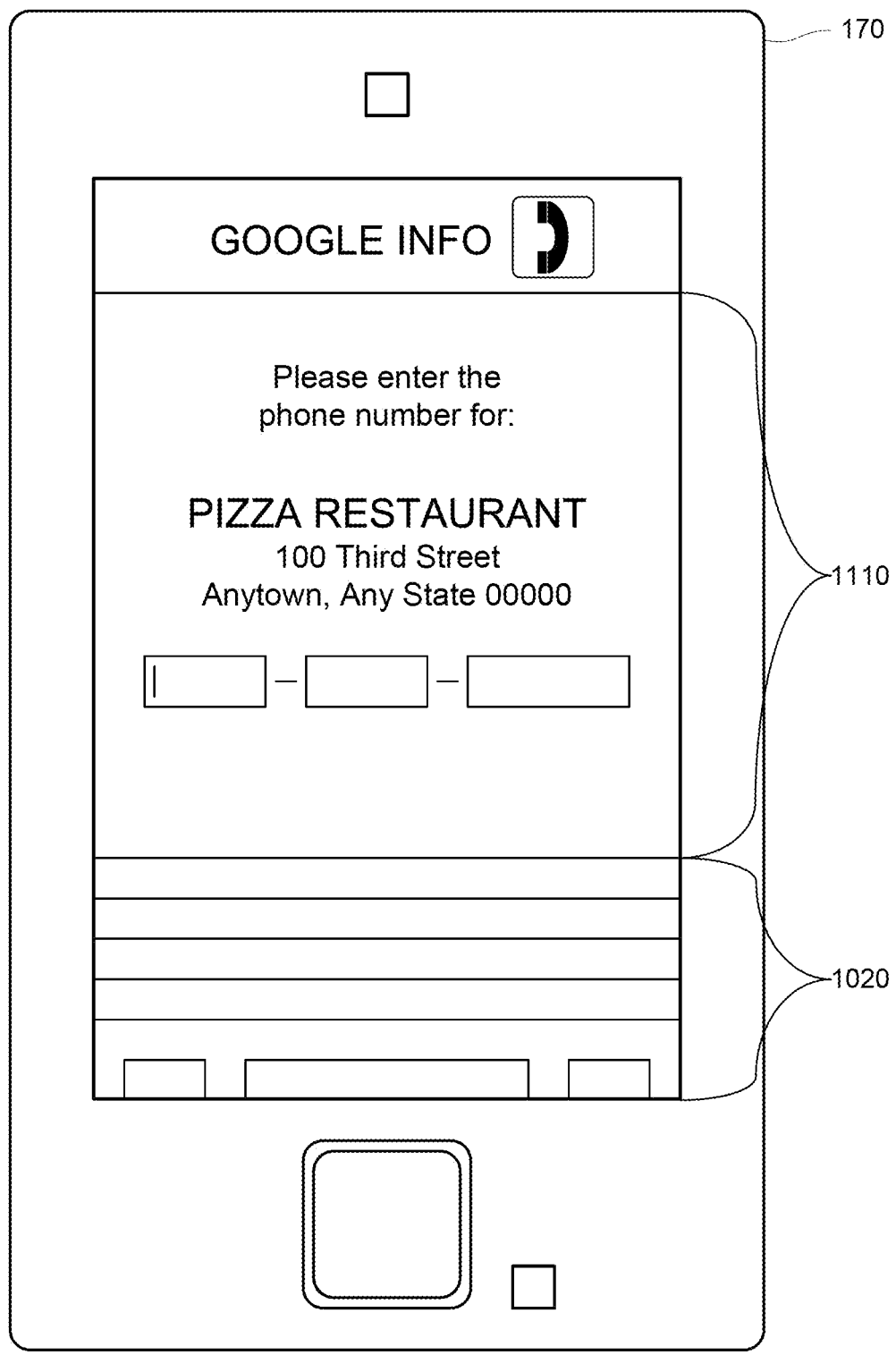
FIG. 11 is a client device and screen image in accordance with an aspect of the invention.

In some instances, such as where the required information is not specifically an image of the outside of a building, the user may provide the server with the information in any number of ways. For example, if the required information is the hours of operation of a business, the user may capture an image of this information and provide server 110 with an image. As shown in FIG. 10, client device 170 may capture an image 1010 of a sign including the hours of operation of a business. In another example, if the required information is simple text, such as a phone number, the user may enter the information into the client device manually. As shown in FIG. 11, client device 170 may display a request 1110 for a phone number. The user may enter the request phone number using user inputs such as keyboard 1120. If the requested information is more complicated than a single image of a building or a telephone number, such as a restaurant menu, several images may be captured and sent to server 110. If the client device is equipped with a video camera, the client device may be used to take a video of the required information.

If the user uploads an image, the server may perform various verifications. For example, upon receipt of an image, the server 110 may decide if the image matches other information about the location that is already accessible by the server. The verification process may involve manual moderation or computer processing to match an image against any known images. Server 110 may compare the uploaded image to prior images of the location, images nearby the location, or images which have already been verified. If the image is too different from other images of the location, it may be rejected. In another example, a phone number may be verified by calling it, or a web site may be verified by visiting it, etc. Information may also be verified by independent sources, though this may reduce the amount of usable information.

Figure 12:
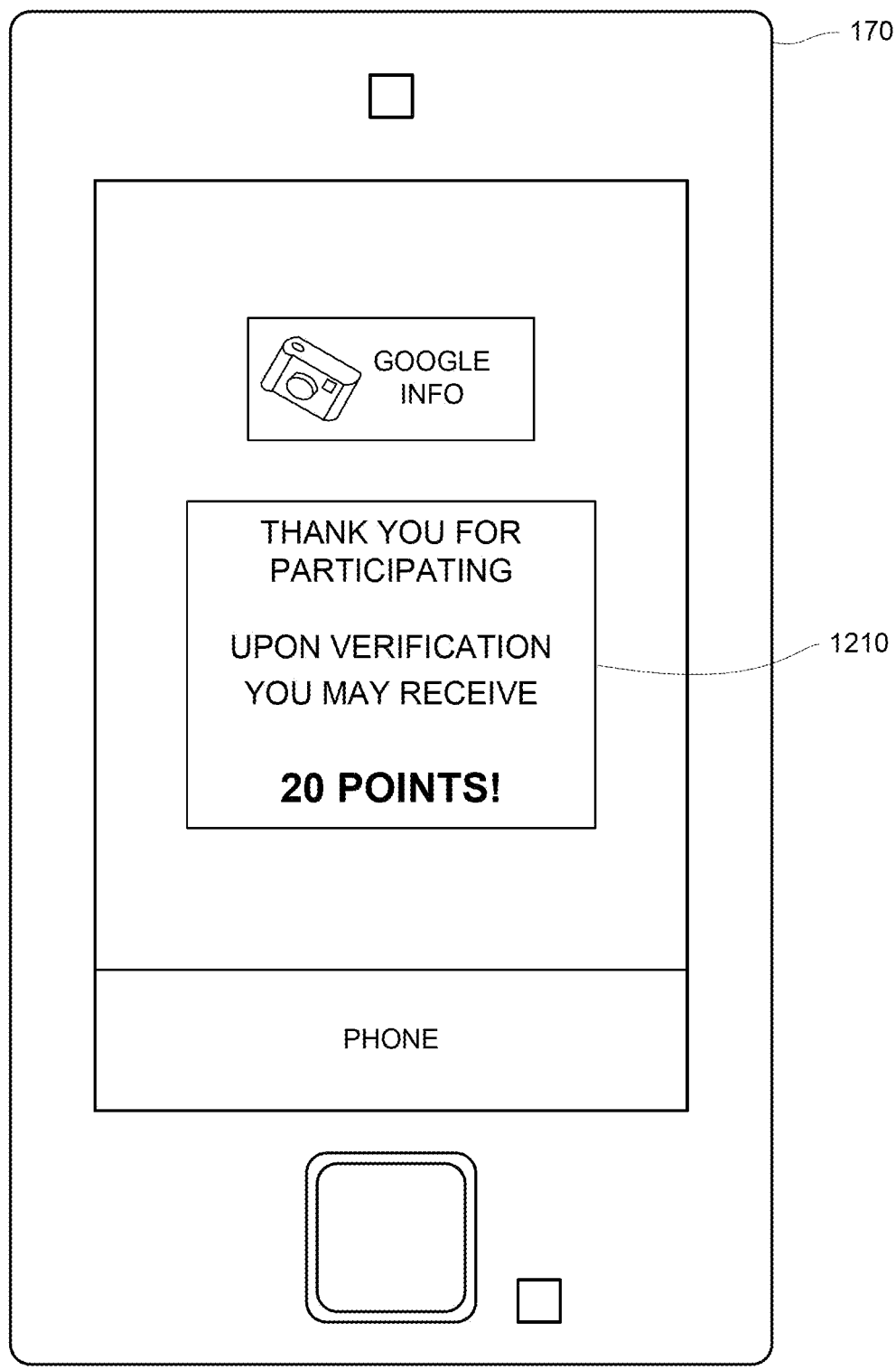
FIG. 12 is a client device and screen image in accordance with an aspect of the invention.
Figure 13:
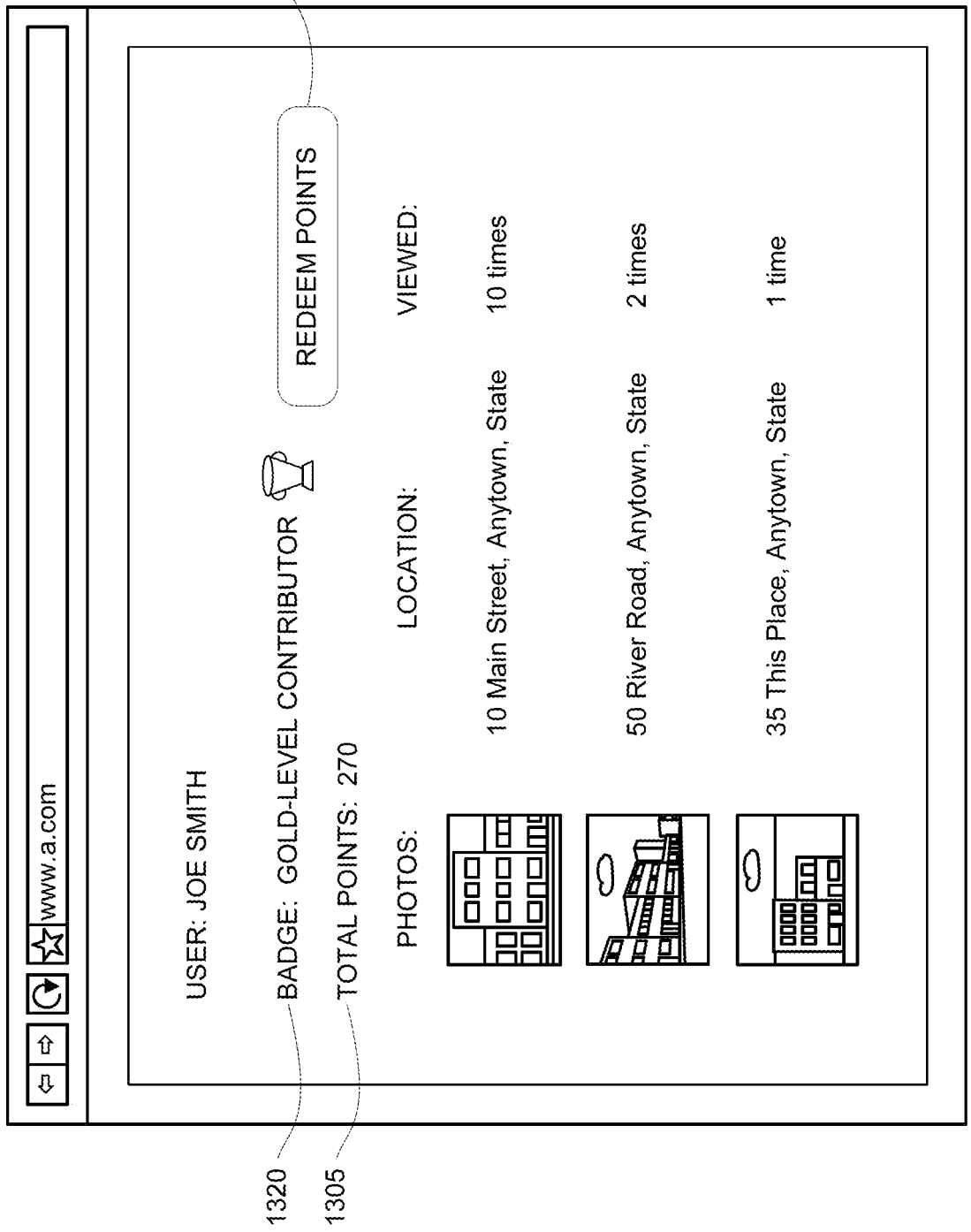
FIG. 13 is a screen shot in accordance with an aspect of the invention.

The user may also receive incentives to provide required information. For example, as shown in FIG. 12, the device 170 may display a confirmation screen 1210 thanking the user for the information and indicating points earned or to be earned. As shown in FIG. 13, the system and method may use various other incentives, for example recognizing the user by giving him or her a title that represents the extent of his or her contributions. The system may also publicly identify the user who provided a particular image as the photographer or source when other users view the image. The system may further reward the user by tracking user participation and allowing users to see how many times an uploaded image has been viewed by others.

Once information has been uploaded, and in some cases verified, the server may associate the information with the geographic location where the information was collected or captured. When a user requests information regarding the location, the server may provide for display on a client device the uploaded information associated with the location.

In addition to the incentives described above, the server may also assign values which are redeemable for some other awards. For example, each location and required information may be associated with a point, token, monetary, or an arbitrary value. Returning to FIG. 6, each location may be associated with a point value, which may be indicative of the importance of additional images. For example, where there is no image data, the point value for uploading an image may be greater than where image quality is poor. The point value where image quality is poor may be greater than where the image is out of date. In another example, the point value may be greater for submitting required hours of operation than for a required fax number. In this regard, the user may be incentivized to gather and upload required information to accumulate point values. In addition, the system and method may require that the image be verified prior to awarding points to a user. Returning to FIG. 13, a user may accumulate points 1305 which may be redeemed, for example by selecting a redeem button 1310, for items, additional recognition, money, etc.

Users may also earn icons, symbolic titles or badges indicating a level of contribution. For example, a user who contributes often may earn the gold-level contributor badge 1020, whereas users which contribute less may be a silver or bronze level contributor. Badges may also be earned for a specific number or certain types of uploads, for example, for uploading an image of an especially significant place or images of locations in "uncharted territory."

These incentives may be useful to establish competition among users. For example, a user may compete with other users for the greatest contribution of images, badges, or number of points. The "winner" may be awarded a monetary value or monetary bounties may be offered for images in some or all areas. In another example, users could get a special value for uploading an image to perfectly match a historical photograph. This would allow users to make side by side, "then and now" comparisons.

The system and method may also provide users with the number of times information uploaded by the user has been viewed by others. As shown in FIG. 10, after a period of time, days or weeks, a user may retrieve a profile page indicating the number of times the user's uploaded images have been viewed and various other types of information.

The combination of two or more of the above mentioned incentives may also be encouraging to users and result in additional uploads.

The points awarded to users may also be used for other purposes, such for identifying the quantity and quality of information which a user has contributed. In order to maximize the quantity and quality of the received information, notifications may be directed to users based on this information. For example, the server may send notifications to users periodically, such as once a day. If a particular user (or client device) has contributed some notable quantity of required information (i.e. high quantity of information), the server may send notifications to the particular user more often, such as twice a day or more. In addition, if a user contributes a large amount of required information (e.g. low quality information), but the contributions do not pass the validation requirements, the server may send the user fewer notifications. This allows for targeting requests not only by geographic location of the users, but also based on the user's past participation.

A user may also select or set certain notification preferences. For example, the user may register for notification within a specific geographic area, such as within a distance from the user's home. In another example, the user may specify a maximum distance or minimum point value, such as if the user is only willing to travel 2 miles or 2 city blocks and/or only for required information which has a point value of 20 or higher. In a further example, the user may register only for notifications of a specific type, such as notifications of a competition or of a location where there are no images.

The user may also choose to opt out of notifications. For example, if a user receives a notification, the display may include an option to ignore the alert, such as an "alert me next time" option. The user may also turn off or silence the notifications for a period of time or until the user turns the notifications on again. In some examples, the user may select to opt out of all notifications permanently.

In some instances, locations where additional images are needed may be identified based on the time of day. Where the number of requests regarding a location is greater during a particular time of day, server 110 may determine that additional images of the location at a different time of day may be required. For example, a greater number of users may request information regarding the "Las Vegas Strip" during evening hours. Server 110 may determine that additional images of the Las Vegas Strip in the evening may be required and send notifications accordingly.

Rather than notify users automatically via a dedicated notification/upload program, the server may wait for a request from the client device. For example, a user may receive a notification in response to a search request. The client device may use a browser such as Google Chrome or the browser installed on a Google Android cell phone to send a request for information to server 110. During the connection protocols, the browser may automatically transmit information regarding the current location of the client device to the server 110. Server 110 may use this information to determine a location of the client device and to determine if there are locations near the client device which are associated with required information. If server 110 determines that a location near the client device requires information, the server may send a notification to client device 170, such as via a web page that is displayed on the client device's browser.

Figure 14:
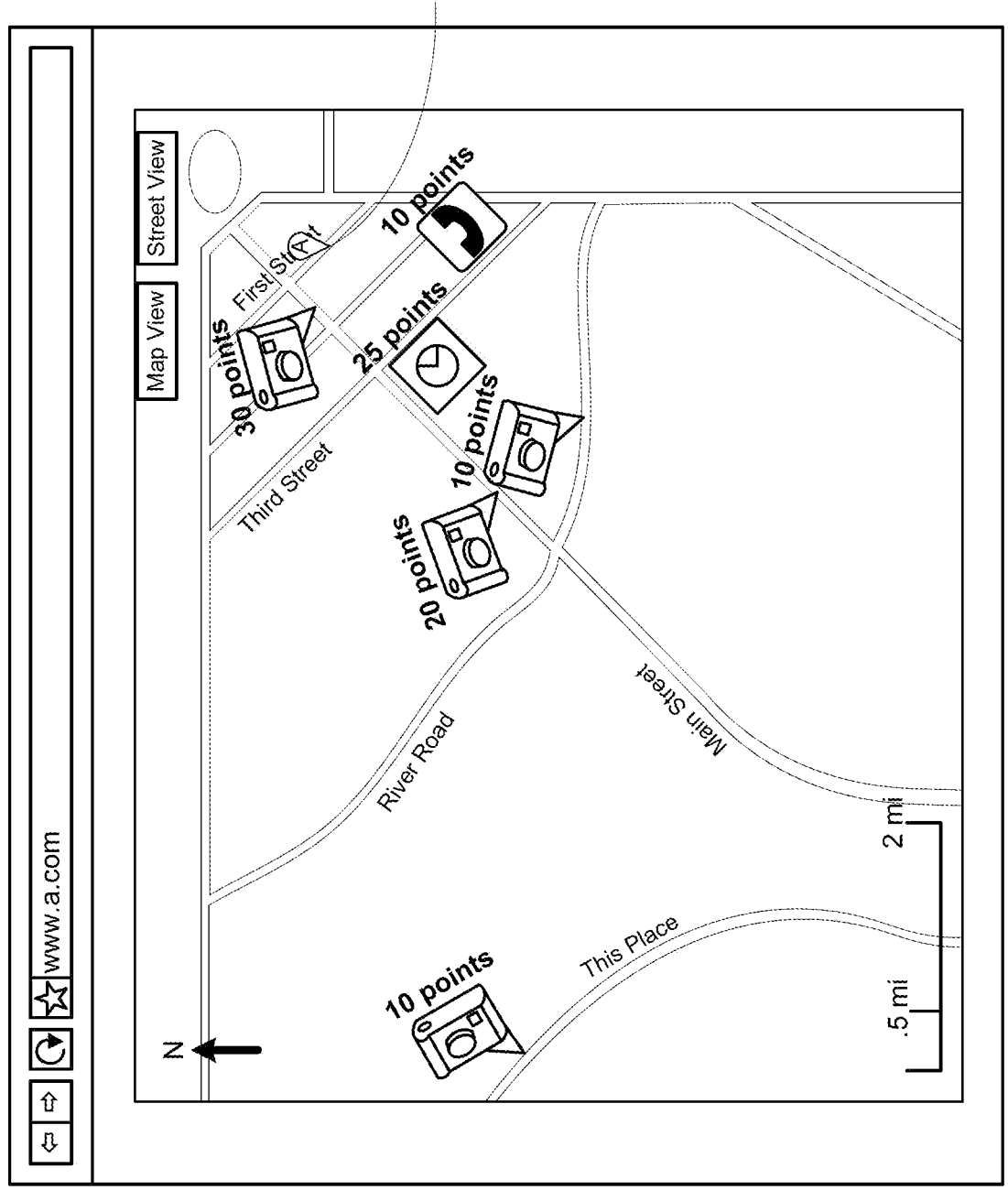
FIG. 14 is a screen shot in accordance with an aspect of the invention.
Figure 15:
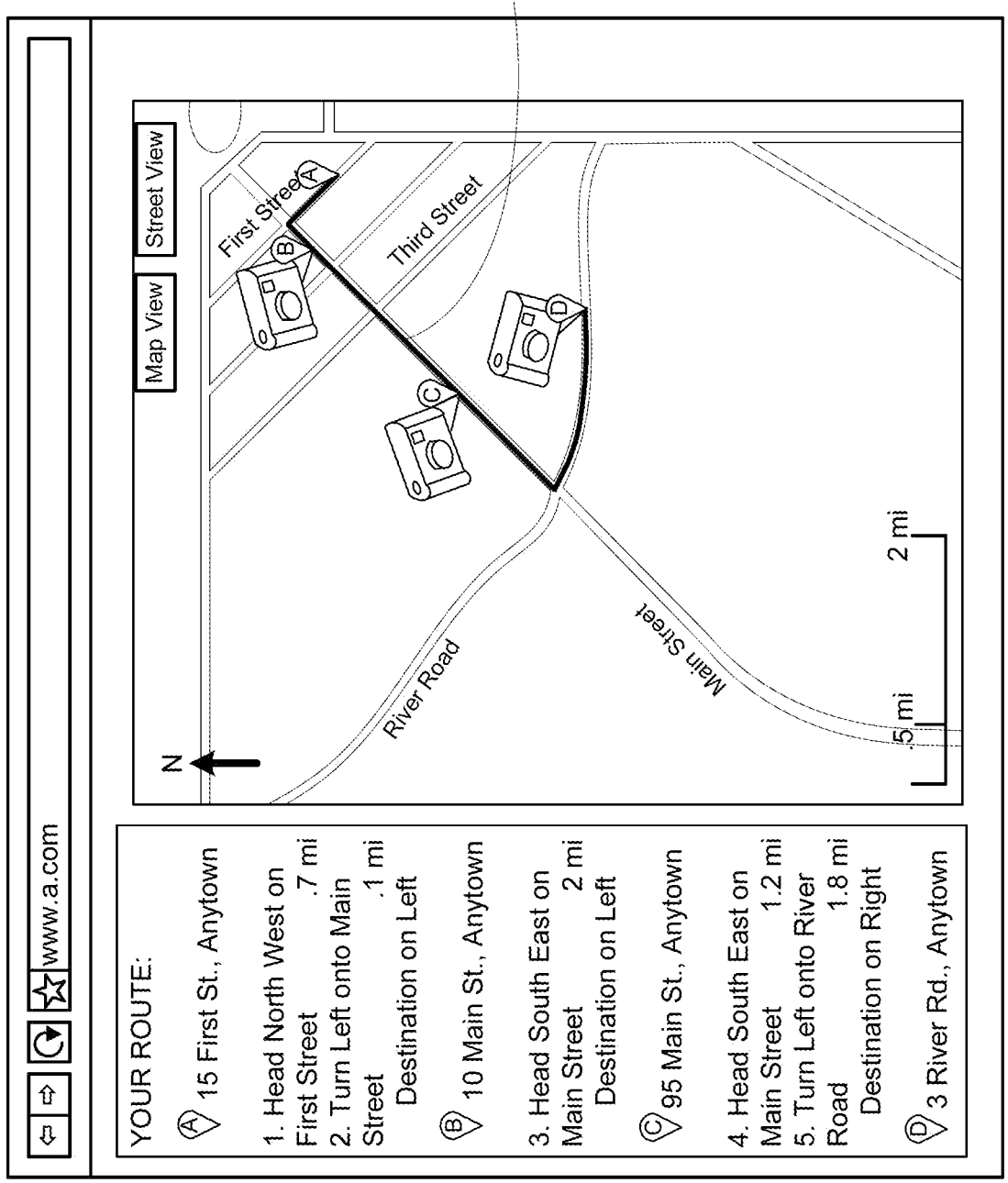
FIG. 15 is a screen shot in accordance with an aspect of the invention.

The system and method may allow users to determine a route for visiting locations to take and upload required information. As shown in FIG. 14, server 110 may provide the user device with a map indicating locations which require additional images. This may allow the user to determine optimal locations, i.e. those with the most points, and plan an outing. For example, a user may request locations which require additional images proximate to a particular location or may receive the locations as a result of a notification. In this regard, indicator pin "A" of FIG. 14 may be associated with a location requested by a user or with the user device itself. And, as shown in FIG. 15, a user may choose a route 1510 based on the locations where the user intends to take pictures.

The user may also take an image on a device which is different than the client device that notified the user of the desired location, such as a digital camera.

The user may further upload the required information at a later time. For example, a user may take an image with a digital camera and upload an image at a later time by connecting the camera or phone with a laptop or desktop computer. Yet further, if the image was captured with a device that is capable of wirelessly connecting to the Internet, the user may upload the photo by using the client device I s built-in browser and logging into a site associated with server 110.

Notifications may also request images of current events. Server 110 may determine current events from connecting to one or more information servers 180 to review news feeds or as a result of user queries regarding the event. Current event notifications may have expiration dates, for example, to ensure that the images are collected promptly or as the event is happening.

Notifications may request specific types of required information. For example, a user may receive a notification requesting a close up image of a store front or anywhere text may be found. In another example, a user may receive a notification requesting images or video from various angles to avoid obstructions such as cars, trees, or the line.

The system and method may also involve prompting a user to register the information. For example, the user may be asked to register an image against nearby images, known landmarks, or 3D data. In another example, the user may be asked to identify any recognizable faces in an image so that the faces may be blurred for privacy reasons.

In other aspects, functions described above as being performed by the server may be performed by the client device, and vice versa. For example, the client device may store and retrieve the map tiles for display on the device. In yet more aspects, the client device and server perform and share different functions.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A system for maintaining comprehensive and up to date map service data comprising:
   memory storing lists of information elements each associated with one or more business types and sets of information elements associated with one or more geographic locations; and
   a processor coupled to the memory and being configured to:
   receive a current location of a client device;
   determine the current location of the client device is proximate to a first geographic location of the one or more geographic locations;
   determine a business type of the one or more business types located at the first geographic location of the one or more geographic locations;
   retrieve, from the lists of information elements stored in the memory, a list of information elements associated with the business type;
   retrieve, from the sets of information elements stored in the memory, a set of information elements associated with the first geographic location;
   compare the list of information elements associated with the business type to the set of information elements associated with the first geographic location;
   determine at least one missing information element missing from the set of information elements based on the comparing, wherein the at least one missing information element includes one or more of a name of the business, hours of operation of the business, a phone number of the business, an email address of the business, and a menu for the business;
   based on the at least one missing information element and the determination that the current location of the client device is proximate to the first geographic location, transmit a request to the client device to obtain the at least one missing information element, the request including information identifying the at least one missing information element and the first geographic location;
   receive the at least one missing information element from the client device, wherein the received at least one missing information element is contained in an image;
   determine a level of similarity between imagery in the received image and imagery within one or more previously verified images captured at or near the first geographic location;
   verify the received image was captured at the first geographic location based upon the level of similarity between the imagery in the received image and the imagery in the one or more previously verified images being above a threshold value;
   extract the at least one missing information element from the verified received image; and
   update the set of information elements associated with the first geographic location to include the extracted at least one missing information element.

2. The system of claim 1, wherein the current geographic location is proximate to the first geographic location if the first geographic location is within a fixed distance from the current geographic location.

3. The system of claim 1, wherein the processor is further configured to: associate the at least one missing information element with the first geographic location; and store the association in the memory.

4. The system of claim 1, wherein the processor is further configured to transmit additional requests for information to the client device if the client device has previously contributed to the set of information elements stored in the memory.

5. The system of claim 1, wherein the processor is further configured to transmit the request over a network for display on a display of the client device, the request comprising an indication of the first geographic location and the at least one missing information element.

6. A method for maintaining comprehensive and up to date map data comprising:
   receiving, by one or more processors, a current location of a client device;
   determining, by the one or more processors, that the current location of the client device is proximate to a first geographic location;
   determining, by the one or more processors, a business type located at the first geographic location;
   retrieving, by the one or more processors, from lists of information elements stored in a memory, a list of information elements associated with the business type at the first geographic location;
   retrieving, by the one or more processors, from sets of information elements stored in the memory, a set of information elements associated with the first geographic location;
   comparing, by the one or more processors, the list of information elements associated with the business type at the first geographic location to the set of information elements associated with the first geographic location retrieved from the memory;
   determining, by the one or more processors, at least one missing information element missing from the set of information elements based on the comparing, wherein the at least one missing information element includes one or more of a name of the business, hours of operation of the business, a phone number of the business, an email address of the business, and a menu for the business;
   based on the at least one missing information element and the determination that the current location of the client device is proximate to the first geographic location, transmitting a request to, the client device to provide the at least one missing information element, the request including information identifying the at least one missing information element and the first geographic location;
   receiving, by the one or more processors, the at least one missing information element from the client device, wherein the received at least one missing information element is contained in an image;
   determining, by the one or more processors, a level of similarity between imagery in the received image and imagery within one or more previously verified images captured at or near the first geographic location;
   verifying, by the one or more processors, the received image was captured at the first geographic location when the level of similarity between the imagery in the received image and the imagery in the one or more previously verified images being above a threshold value;

extracting, by the one or more processors, the at least one missing information element from the verified received image; and updating the set of information elements associated with the first geographic location to include the extracted at least one missing information element.

7. The method of claim 6,
wherein the current geographic location is proximate to the first geographic location if the first geographic location is within a fixed distance from the current geographic location.

8. The method of claim 6,
wherein the determination of whether the client device is proximate to the first geographic location is performed at a server computer.

9. The method of claim 6, further comprising:
associating, by the one or more processors, the at least one missing information element with the first geographic location; and storing the association in the memory.

10. The method of claim 6,
wherein the received current geographic location includes latitude and longitude information.

11. The method of claim 6, wherein the at least one missing information element is an image.

12. The method of claim 6,
wherein the request requests the user input at least one additional missing information element as text.

13. The method of claim 6,
further comprising transmitting additional requests for information to the client device if the client device has previously contributed to the set of information elements stored in the memory.

14. The method of claim 6,
further comprising transmitting the request over a network for display on a display of the client device.

* * * * *